Aug. 31, 1948.          R. A. KASER          2,448,266
              CYLINDER CONSTRUCTION
               Filed Aug. 30, 1945

INVENTOR.
Robert A. Kaser
BY
Wood, Arey, Herron & Evans
Attorneys.

Patented Aug. 31, 1948

2,448,266

UNITED STATES PATENT OFFICE 2,448,266

CYLINDER CONSTRUCTION

Robert A. Kaser, Chicago, Ill.

Application August 30, 1945, Serial No. 613,502

5 Claims. (Cl. 309—2)

This invention relates to the construction of cylinders, particularly of the type conventionally used in shock absorbers or the like. While the invention will be disclosed in the environment of a shock absorber for an aircraft it will be obvious from the description that the invention has substantially broader application and may be adapted to a variety of different uses.

In the particular field with which the description is concerned, to wit, that of a shock absorber cylinder, there have been a wide variety of types of construction employed. Since a structural failure may cause a serious accident, shock absorber cylinders for aircraft have almost invariably been of a strong and heavy construction employing various types of reenforcing, costly manufacturing operations, and careful fitting and assembly.

The primary object of the present invention has been to provide a cylinder of this type which will be much lighter in weight than those now available, which may be manufactured quickly and cheaply from ordinary materials readily available and which requires a minimum of fitting and assembly operations.

Other more specific objects will be apparent from the further and more detailed description of the preferred embodiment of the invention as shown in the drawings in which.

In the particular installation selected as constituting a preferred embodiment of the invention the shock absorber is of the hydraulic or oleo type. However, since the invention is primarily concerned with the construction of the cylinder itself, the mode of operation will be explained only for the purpose of demonstrating the utility of the construction.

Figure 1:
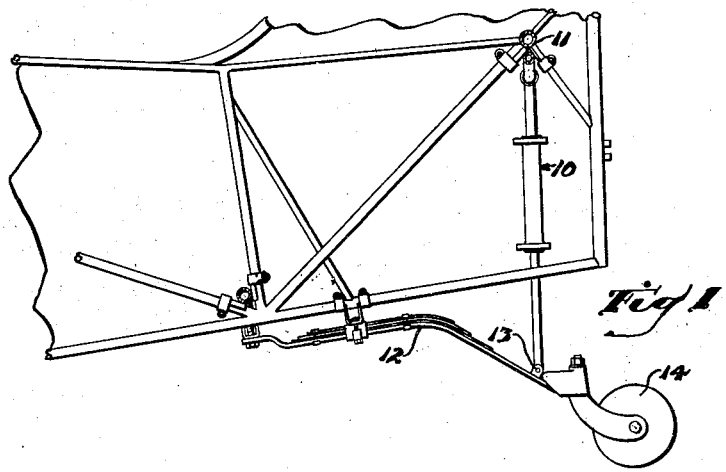
Figure 1 is a view of the tail assembly of an aircraft showing the cylinder of the invention as forming a component part of a shock absorber for the rear landing wheel.

In Figure 1 the cylinder, representing a preferred embodiment of the invention, is indicated generally at 10 and is illustrated in mounted position as at 11 on struts of the tail assembly of an aircraft. A depending spring 12 is shown rigidly mounted on the aircraft and an end of the cylinder 10 is pivotally secured to the spring 12 as at 13. A conventional landing wheel 14 is mounted on the extended end of the spring 12. The operation of the shock absorber so mounted and positioned will be apparent to those familiar with the construction of airplanes or other vehicles.

Figure 2:
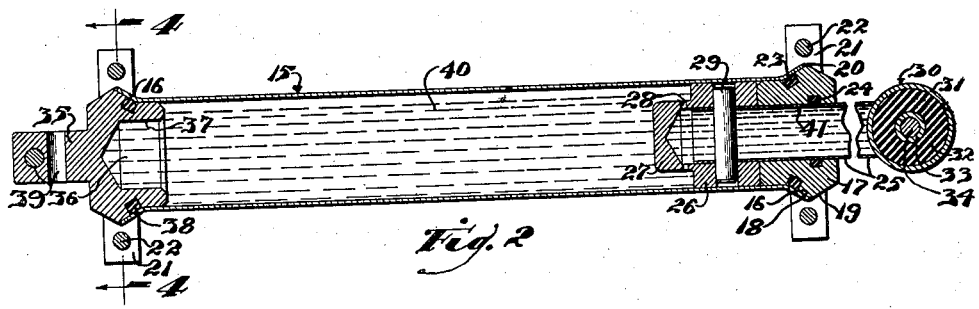
Figure 2 is a sectional view through the cylinder with the plunger in retracted position particularly illustrating the details of construction.
Figure 3:
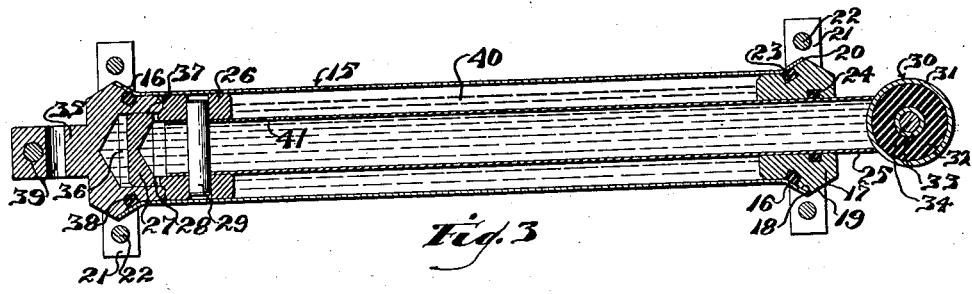
Figure 3 is a view similar to Figure 2 showing the plunger in fully advanced position.
Figure 4:
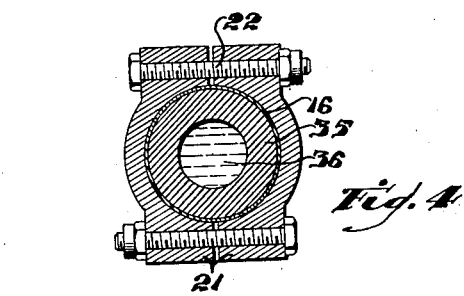
Figure 4 is a sectional view along the line 4—4, Figure 2.

The details of the construction of the cylinder are illustrated in Figures 2 and 3. A cylindrical tube 15 forms the main element. As shown, this may be substantially filled with oil 40 or other hydraulic fluid. The tube 15 has outwardly flared edge portions 16 at each end thereof. Considering the edge of the tube shown at the right in Figures 2 and 3, the end closure cap 17 is inserted in the open end of the tube and has tapered outer surfaces 18 adapted to engage with the flared edges of the tube. The end cap 17 likewise has edges 19 which extend beyond the tube and which are tapered in a reverse direction from the edges 18 providing an angular flange 20 extending peripherally around the cap for supporting the inner surfaces of a clamp 21. This clamp, which is shown in detail in Figure 4, comprises clamp elements in the form of a split ring secured together by attachment means 22. The tightening of these attachment means secures the clamp firmly around the angular flange 20.

Sealing rings formed of rubber and of the type known as O rings are disposed peripherally of the tube and the plunger and assist in providing a seal between the outer surface of the end cap and the inner surface of the tube, and the inner surface of the end cap and the plunger. In the end cap 17 at the right in Figures 2 and 3 these rings have been designated 23 and 24, respectively. A similar ring is utilized in connection with the left-hand end cap, the details of which will be described subsequently.

The plunger is of comparatively conventional construction and comprises a cylindrical tubular member 25 and a head portion 26. The cylindrical member 25 is inserted into the cylinder 15 through a bore in the end cap member 17. The front edge of the head portion is configurated to form the extended nose 27. Ports 28 are formed around the periphery of this nose portion for the entrance of oil into the piston as it moves forward on its stroke. The head portion of the piston may be pinned to the tube 25 by the pin 29.

At the right-hand end of the tubular piston portion 25 a fluid and air tight joint is formed with the connecting collar 30. In the form shown, this element includes an outer cylindrical shell 31, an interior gasket of rubber or the like 32 disposed between the shell 31 and bearing 33. Within this bearing 33 a shaft 34 provides a means on which the shock absorber pivots when in attached position.

The left-hand end closure member 35 is of similar construction to the right-hand member 17 except that an interior space 36 is defined by the shoulders 37 and is of a width to permit the entrance of the nose portion 27 of the piston when the latter is at the end of its stroke. A sealing ring 38 is disposed between the inner surface of the cylinder and the outer surface of the closure member. Bore 39 formed in an extension of the left-hand end cap permits pivotal attachment of the member, or alternatively, may be utilized to attach a tube to the end of the unit.

In the operation of the device, as the plunger commences its stroke the oil within the cylinder 15 is forced through the ports 28 into the piston cylinder 25, but since the ports are restricted in size a continuous cushion is provided which makes a very effective shock absorber for uses such as in conjunction with the landing wheel of an aircraft.

Another pair of ports 41 are provided in the plunger wall behind the piston head 27. In the forward stroke these ports function to siphon oil back into the cylinder from the plunger, whereas in the return stroke the operation is reversed and the ports 28 become outlet ports and the ports 41 are inlet ports.

At the completion of the stroke the plunger will return to the position shown in Figure 2 by gravity or spring means such as 12, Figure 1, may be utilized.

The invention resides primarily in the construction of the main cylinder 15. This may be formed of light metal such as aluminum and the inside may be furnished with an appropriate burnishing tool prior to assembly thereby dispensing with the expensive machining operations which are conventional in some types of cylinders. The end cap members may be fabricated by the use of conventional machinery and tools and may also be formed of comparatively light metal. The provision of the joint between the flared ends of the tubing and the end cap members held in position by the clamps provides an exceedingly tight and secure closure but at the same time does not add greatly to the weight of the completed structure. Effective sealing action is provided by the O rings which it will be noted are subject to a degree of compression upon tightening of the clamps. The characteristic rolling and extending action of the O rings under hydraulic pressure also assists in the sealing action.

The structure is one which can be manufactured quickly and cheaply but which is very efficient in operation.

Obviously, various changes and adaptations may be made in the cylinder construction without departing from the scope of the invention as herein described.

Having fully described the invention, I claim:

1. In a shock absorber, a cylindrical tube having its end edges flared outwardly, an end cap member adapted to be inserted in an end of the tube, said end cap member having outer surfaces coinciding in contour with the flared edges of the tube and having a portion thereof extending beyond the end of the tube, a clamp extending peripherally around the end of the tube, said clamp engaging the end cap member and the end of the tube for holding the cap member securely positioned in the tube.

2. Cylinder construction comprising a tubular member having its end edges flared outwardly, end cap members for closing the ends of said tubular member, said end cap members having outer surfaces coinciding in contour with the flared edges of the tube and having portions extending beyond the ends of the tube, sealing gaskets disposed between the end cap members and the tube and clamps extending peripherally around the ends of the tube and engaging the flared ends thereof and the portions of the end caps extending beyond said flared ends.

3. In a shock absorber, a tubular member having its end edges flared outwardly, an end closure member inserted within the tubular member and having outer surfaces coinciding in contour with the inner surface of the end of said tubular member, said end closure member having a portion extending beyond the end of the tubular member, a clamp secured to the tubular member and to the portion of the end closure member extending beyond the end of the tubular member, said end closure member having a bore formed in the central portion thereof, and a plunger inserted in said bore.

4. In a cylinder for shock absorbers or the like, a cylindrical tube having its end edges flared outwardly, an end closure member inserted within the tube and having outer surfaces coinciding with the flared edges of the tube, a portion of said end closure member extending beyond the end of the tube, a clamp extending peripherally around the tube and engaging the portion of the end closure member extending beyond the end of the tube, and means for tightening the clamp to maintain the end closure member securely positioned in the tube.

5. Cylinder construction comprising a hollow tubular member having its end edges flared outwardly, end closure members having portions thereof inserted one in each end of the tubular member, the outer surfaces of said closure member portions coinciding in contour with the inside of the flared edges, the portions of the closure members extending beyond the tube being tapered to form with the flared edges of the tube angular peripheral flanges, and clamps, having their inner surfaces coinciding with those of the flanges, positioned on said flanges, and means for tightening the clamps to secure the closure members in position on the ends of the tubular member.

ROBERT A. KASER.

REFERENCES CITED

The following references are of record in the file of this patent:

UNITED STATES PATENTS

| Number | Name | Date |
| --- | --- | --- |
| 446,364 | Peacock | Feb. 10, 1891 |
| 901,837 | Russell | Oct. 20, 1908 |
| 937,437 | Halstead et al. | Oct. 19, 1909 |
| 1,526,309 | Hof | Feb. 10, 1925 |
| 1,838,636 | Reid | Dec. 27, 1931 |
| 1,875,068 | Malby | Aug. 30, 1932 |
| 2,165,052 | Hering | July 4, 1939 |
| 2,169,395 | Rheem | Aug. 15, 1939 |
| 2,381,869 | Amrhein et al. | Aug. 14, 1945 |